US011286903B2

(12) United States Patent
Brogan et al.

(10) Patent No.: US 11,286,903 B2
(45) Date of Patent: Mar. 29, 2022

(54) METHOD OF STARTING A WIND PARK

(71) Applicant: Siemens Gamesa Renewable Energy A/S, Brande (DK)

(72) Inventors: Paul Brian Brogan, Glasgow (GB); Nikolaus Goldenbaum, Ry (DK); Thyge Knueppel, Lenzie (GB)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 16/970,672

(22) PCT Filed: Feb. 20, 2019

(86) PCT No.: PCT/EP2019/054144
§ 371 (c)(1),
(2) Date: Aug. 18, 2020

(87) PCT Pub. No.: WO2019/166290
PCT Pub. Date: Sep. 6, 2019

(65) Prior Publication Data
US 2020/0400120 A1 Dec. 24, 2020

(30) Foreign Application Priority Data

Feb. 28, 2018 (EP) .................................. 18159166

(51) Int. Cl.
*F03D 7/02* (2006.01)
*F03D 9/11* (2016.01)
(Continued)

(52) U.S. Cl.
CPC ............. *F03D 7/026* (2013.01); *F03D 7/048* (2013.01); *F03D 9/007* (2013.01); *F03D 9/11* (2016.05);
(Continued)

(58) Field of Classification Search
CPC .. F03D 7/026; F03D 7/048; F03D 9/11; F03D 9/257; F03D 9/007; H02J 3/388;
(Continued)

(56) References Cited

U.S. PATENT DOCUMENTS

2008/0284172 A1* 11/2008 Nielsen ................... F03D 7/048
290/44
2015/0380942 A1* 12/2015 Premm ................... H02J 3/386
307/52
2017/0009744 A1* 1/2017 Brogan ................... G05F 1/455

FOREIGN PATENT DOCUMENTS

EP 1 993 184 A1 11/2008
EP 2 843 787 A1 3/2015
(Continued)

OTHER PUBLICATIONS

International Search Report and Written Opinion dated Jun. 13, 2019 for PCT/EP2019/054144.
(Continued)

*Primary Examiner* — Sean Gugger
(74) *Attorney, Agent, or Firm* — Schmeiser, Olsen & Watts LLP

(57) ABSTRACT

Provided is a method for starting a wind park including plural wind turbines connectable in a collector system connectable to a utility grid, the method including: starting at least one first wind turbine, each being equipped with an utility grid independent energy supply and a grid forming function, to produce electrical energy from wind energy, thereby utilizing the respective grid independent energy supply for starting; performing the grid forming function by the first wind turbine to achieve a reference voltage in the collector system; starting at least one second wind turbine and/or at least one third wind turbine to produce energy by
(Continued)

Figure 1:
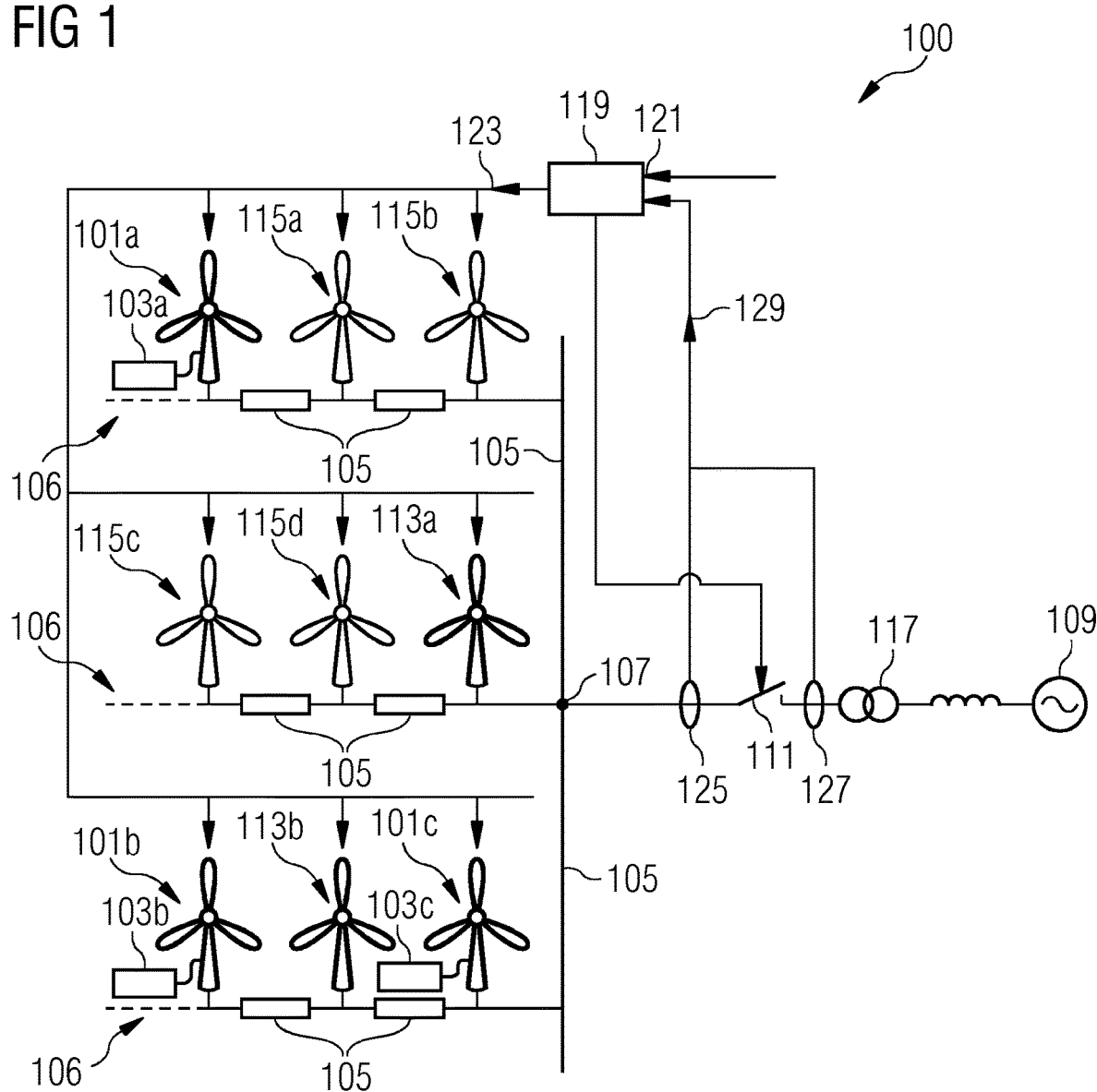

conversion of wind energy, thereby utilizing energy provided in the collector system for starting.

13 Claims, 4 Drawing Sheets

(51) Int. Cl.
    *F03D 9/25*    (2016.01)
    *H02J 3/38*    (2006.01)
    *F03D 7/04*    (2006.01)
    *F03D 9/00*    (2016.01)
    *H02J 3/32*    (2006.01)

(52) U.S. Cl.
    CPC .............. *F03D 9/257* (2017.02); *H02J 3/381* (2013.01); *H02J 3/388* (2020.01); *F05B 2260/85* (2013.01); *H02J 3/32* (2013.01); *H02J 2300/10* (2020.01); *H02J 2300/22* (2020.01); *H02J 2300/28* (2020.01)

(58) Field of Classification Search
    CPC .......... H02J 3/381; H02J 3/32; H02J 2300/28; H02J 2300/10; H02J 2300/22; F05B 2260/85

See application file for complete search history.

(56) References Cited

FOREIGN PATENT DOCUMENTS

| | | |
|---|---|---|
| EP | 3 116 085 A1 | 1/2017 |
| WO | 2012/139667 A1 | 10/2012 |
| WO | 2014/140281 A1 | 9/2014 |

OTHER PUBLICATIONS

Göksu, Saborio-Romano, Cutululis, Sorensen: "Black Start and Island Operation Capabilities of Wind Power Plants"; 16th International Wind integration workshop, Berlin Oct. 25-27, 2017.

\* cited by examiner

METHOD OF STARTING A WIND PARK

CROSS-REFERENCE TO RELATED APPLICATIONS

This application claims priority to PCT Application No. PCT/EP2019/054144, having a filing date of Feb. 20, 2019, which is based on EP Application No. 18159166.0, having a filing date of Feb. 28, 2018, the entire contents both of which are hereby incorporated by reference.

FIELD OF TECHNOLOGY

The following relates to a method for starting a wind park comprising plural wind turbines connectable in a collector system connectable to a utility grid and further relates to a wind park being configured to perform the starting method.

BACKGROUND

Due to faults in the utility system or due to faults in the export connection of a wind park or due to low wind conditions, a wind park may be standing still (not producing electric energy) and may be disconnected from the utility grid. In particular, a full or a partial blackout of the utility grid may be present. The requirement may exist that the wind park is configured for reenergizing the whole wind park following a full or a partial blackout of the connecting power system. A black start of the wind farm may be considered to be a start of the wind park without being connected to a utility grid delivering power for starting the wind turbines.

Conventionally, a power system black start may be achieved by purchasing this service from a number of strategically located power stations that have the necessary equipment to allow them to start up without support from the utility system itself. As the backbone of the transmission system is gradually energized, more power stations (e.g. steam turbines, gas turbines or wind turbines) without black start capability may start up helping support the system thereby allowing for a gradual re-connection of the loads. Conventionally, the task of energizing a wind park is predominantly handled by the utility grid through its mix of connected generators, i.e. the wind park is energized by closing the circuit breaker at the point of interconnection between the wind park and the connecting power system. Trials may have been conducted where a voltage-source converter based HVDC station performs a black start.

Conventionally, auxiliary power needed for an islanded wind farm (i.e. a wind farm which is disconnected from the utility grid) required for starting may conventionally come from either diesel generators or a combination of diesel generators and power produced by wind turbines already running in the wind park. Problems with diesel generators (in particular in a large offshore wind farm) may be that they are expensive to run, that they are expensive to install, that they might require additional jack-up vessels and that they need regular maintenance and refueling.

Thus, there may be a need for a method for starting a wind park and there may be a need for a wind park which is enabled to start from a situation, where the wind park is disconnected from the utility grid, in a fast and reliable manner.

SUMMARY

According to an embodiment of the present invention it is provided a method for starting a wind park comprising plural wind turbines connectable in a collector system connectable to a utility grid, the method comprising: starting at least one first wind turbine, each being equipped with an utility grid independent energy supply and a grid forming function, to produce electrical energy from wind energy, thereby utilizing the respective grid independent energy supply for starting; performing the grid forming function by the first wind turbine to achieve a reference voltage in the collector system; and optionally starting at least one second wind turbine and/or at least one third wind turbine(s) to produce energy by conversion of wind energy, thereby utilizing energy provided in the collector system for starting.

The collector system may operate within normal range of voltage and frequency controlled by the first wind turbine(s), optionally one or more second turbine(s) may be started and may perform the same grid forming function as the first turbine and producing energy by conversion of wind energy.

If there are N turbines in total in the wind park, there may be by X first turbines, Y second turbines, and Z third turbines, where N=X+Y+Z, we would then have X<=N, Y>=0, Z>=0.

The method may be performed by the plurality of individual wind turbines of the wind park, each wind turbine may contribute a portion to the starting method. The method may not require a concerted control by a wind park controller. For example, each of the at least one first wind turbine may act independently from any other of the at least one first wind turbine and/or also independent of any second wind turbine(s) and/or any third wind turbine(s). The method may be implemented partly in hardware and/or software for example in respective wind turbine controllers.

Each wind turbine may comprise a rotor shaft at which plural rotor blades are connected. The rotor shaft may be mechanically coupled to an electric generator, for example a synchronous permanent magnet generator which, upon rotation of the rotor shaft, generates in particular variable frequency AC power. An optional gearbox may be present between the rotor shaft and the generator. Output terminals of the generator may be connected to a AC-DC-AC converter which may be configured for converting the variable frequency power to a fixed frequency power stream. Each wind turbine may further comprise a wind turbine transformer which may transform the output voltage of the generator to a medium voltage. Output terminals of the respective wind turbine transformer may be connected in (or with) the collector system or which may at least be connectable via respective wind turbine breakers (e.g. power switches).

When the method is performed, the whole collector system may be disconnected from the utility grid and all breakers of all wind turbines to the collector system may be open, such that each wind turbine is disconnected from the collector system. A first group of wind turbines may comprise plural first wind turbines each comprising or being equipped with a respective utility grid independent energy supply, such as energy storage or diesel generator or the like. Using the utility grid independent energy supply components of the at least one first wind turbine which are required for the wind turbine to produce electric energy (such as a yawing system, a pitching system, a heating system, a cooling system or the like) may receive electrical power from the utility grid independent energy supply. Thus, when there is enough wind, the at least one first wind turbine may be yawed into the wind, the pitch angles of the rotor blades may appropriately be adjusted and the respective wind turbine converter may be controlled such as to allow the rotation shaft to be started (to be set in motion), i.e. to increase its rotational speed. During increasing the rotational speed of the generator or the rotation shaft, operational parameters, such as pitch angles or converter control signals, may continuously be supplied to the respective components of the wind turbine, to for example achieve a nominal rotational speed of the rotation shaft. For this initial adjusting the operational parameters, power of the respective grid independent energy supply may be utilized without utilizing the energy produced at the output terminals of the converter.

The grid forming function may only be performed after the first wind turbine has been connected to the collector system. The grid forming function may operate to bring the collector system to desired electrical properties, regarding voltage and/or frequency and/or current, for example. After the collector system has reached a high enough voltage, second and/or third wind turbine(s) may be started utilizing energy or power provided in the collector system for starting.

Thus, before starting the second and/or third wind turbine, the second and/or third wind turbine may have been connected to the collector system.

Thereby, the method provides a black start capability including a grid forming algorithm. Thereby, "black start" is considered to comprise the ability of a power generator to start up even though its main terminals are de-energized (for example the output terminals of the converter of the at least one first wind turbine are de-energized at the beginning). System restoration may describe the process of re-establishing a power network following a full or partial blackout. The method may be applicable for example in two situations or two applications:

1) The power system that the wind farm is connected to has itself experienced a blackout and may require to be re-energized. Provided there is enough wind, the wind farm may do an internal black start and either
   a. close the park breaker and commence energizing the nearby transmission system and/or
   b. synchronize to the frequency on the transmission system across the open park breaker, close the park breaker to connect the wind farm to the transmission system and start supporting the restoration process of the power system. The transmission system may be energized by another generator and the ability of the wind farm to do an internal black start may mean that the restoration process can be faster because the wind farm is already operating and running when the transmission system has been energized.
2) The wind farm is isolated from the main power system (utility system) but may need power for its auxiliaries. Energizing the local wind farm network (also referred to as collector system) using the wind turbines and letting the wind turbines produce the power needed by the local island removes (or at least reduces depending on how long time the wind farm equipment can survive without power) the need to bring in diesel generators.

Embodiments of the present invention may comprise the following features

1) An amount of energy storage in X wind turbines (for example a first group of wind turbines comprising at least one first wind turbine, X≤the number of wind turbines in the wind farm) sufficient to black start these individual wind turbines may be required.
2) A control algorithm (also referred to as grid forming algorithm) in X wind turbines capable of ramping up the converter voltage within the capability (for example available power of the wind and current window in the converter) of the respective wind turbine.
3) A control algorithm in X and Y wind turbines (Y≥0) that may participate in the load balancing on the island and may allow an uncoordinated start-up of the wind turbine (for example a second group of wind turbines comprising at least one second wind turbine). Thereby, no reference or master wind turbine may be required, because the second wind turbines may independently start up and perform the control algorithm.
4) A control algorithm in Z wind turbines (Z≥0) that is not participating in the load balancing on the island. The Z turbines may e.g. run current control on the network side converter controller and will output an active power directly given by their power reference. The Z turbines may independently start up and start producing active power provided that there is a sufficient number of grid forming turbines online to support their operation, e.g. maxRatio>=Zonline/(Xonline+Yonline).
5) A park level controller for high level coordination (for example release of X wind turbines to do black start when ready) and a wind farm level frequency and voltage control may also be present or required. The method may work without the coordination of the park level control but may require more intervention. Thus, according to an embodiment of the present invention, a park level control is provided which may allow for a more self-managing process. The park controller could equally control the release to operation of the Z turbines based on information about already online wind turbines.

According to an embodiment of the present invention, the method further comprises starting at least one second wind turbine being equipped with a grid forming function to produce electrical energy from wind energy, thereby (e.g. exclusively) utilizing energy provided in the collector system for starting up the wind turbine (e.g. not using any grid independent energy supply); performing the grid forming function by the second wind turbine to achieve the reference voltage (e.g. Vref) in the collector system.

The at least one second wind turbine may be one of plural second wind turbines comprised in a second group of wind turbines each being equipped with the grid forming function but not having (or not using) any grid independent energy supply, or at least not using the grid independent energy supply for starting. The grid forming function provided for the second group of wind turbines or for each second wind turbine in the second group of wind turbines may essentially be similar or the same as the grid forming function provided for each of the first wind turbines. Providing also the at least one second wind turbine with the grid forming function may facilitate achieving desired electrical properties of the collector system.

According to an embodiment of the present invention, the method further comprises connecting the first wind turbine to the collector system after having started it; and/or connecting the second wind turbine to the collector system before starting it; and/or connecting the third wind turbine to the collector system before starting it; and/or automatically synchronizing the electrical output of the second wind turbine and/or the third wind turbine with that of the first wind turbine, wherein each of the third wind turbine in particular performs a current control at a converter output terminal of the third wind turbine.

The first wind turbine may not require any power from the collector system for starting. Thus, it may not be required, or it is avoided that the first wind turbine is connected to the collector system before it has started. The second wind turbine of the second group of wind turbines as well as the third wind turbine of the third group of wind turbines both may require (or use) energy from the collector system for starting. Synchronizing (e.g. regarding frequency and/or phase) the electrical output (e.g. AC output) of the successively connecting wind turbines, i.e. the second wind turbine and the third wind turbine, may achieve desired electrical properties in the collector system.

The third wind turbine or any of the third group of wind turbines may not perform a grid forming function but may perform a (conventional) current control at the respective converter output terminal to control the current at the output terminal to satisfy particular electrical requirements, such as current references e.g. calculated from voltage and power references.

According to an embodiment of the present invention, the second wind turbine and/or the third wind turbine is started, if a collector system voltage is between predefined voltage limits. If the collector system voltage and/or frequency is between the predefined limits it may indicate that enough energy or power is already produced by the running first turbine(s) such that start of second and/or third wind turbines using energy from the collector system can be initiated.

According to an embodiment of the present invention, performing the grid forming function by the first wind turbine comprises: ramping up a converter output voltage of a converter of the first wind turbine in a controlled fashion until a current limit and/or power limit of the converter is reached.

At the beginning, the converter output voltage may effectively mirror the voltage level on the collector system and may be essentially zero but may gradually or continuously be increased when performing the method. When the at least one first wind turbine is connected to the collector system thereby also the collector system voltage may rise and may in particular be ramped up.

According to an embodiment of the present invention, ramping up the converter output voltage of the converter of the first wind turbine comprises monitoring an actual frequency of the collector system voltage; deriving a limited reference voltage (e.g. Vref,limited) based on an frequency difference between the actual frequency and a nominal frequency of the collector system voltage; and controlling the converter of the first wind turbine based on the limited reference voltage.

Monitoring the actual frequency of the collector system voltage may allow to determine whether power supply into the collector system is higher or lower than power demand within the collector system. When a condition is detected that the actual frequency is falling, the limited reference voltage may be decreased to reduce the load of the active system. Thereby, an effective load balancing may be achieved which may ensure that the power supply into the collector system essentially matches the power demand within the collector system.

According to an embodiment of the present invention, deriving the limited reference voltage comprises: deriving maximum, minimum and offset of the reference voltage based on a measured collector system voltage and the frequency difference; deriving the limited reference voltage based on the maximum, the minimum and the offset of the reference voltage and the reference voltage (e.g. Vref).

According to an embodiment of the present invention, the reference voltage and/or the limited reference voltage is lower than or equal to a nominal voltage of the collector system until the power produced by conversion of wind of collector system connected wind turbines essentially matches active and/or reactive power demand of the collector system, after which the reference voltage and/or the limited reference voltage is greater than an actual voltage of the collector system.

Thus, the reference voltage may be greater than the actual voltage of the collector system but may be lower than the nominal voltage of the collector system or may be equal to the nominal voltage of the collector system. Thereby, effective load balancing may be achieved as well as effectively and in a fast manner ramping up the collector system voltage until a desired voltage (for example limited reference voltage or reference voltage) is achieved.

According to an embodiment of the present invention, performing the grid forming function by the first wind turbine supports active and/or reactive power requirements of the collector system including the wind turbines connected thereto.

Components of the collector system may require constant supply of active and/or reactive power due to losses, for example in cables, in the transformer and the like. Thereby, stable desired electrical properties at the collector system may be achieved by performing load balancing.

According to an embodiment of the present invention, a power reference (e.g. PrefTotal) of each of the at least one first and the at least one second wind turbine is derived, in particular by a respective converter controller, based on preliminary power reference (e.g. Pref turbine-control) and a power reference offset (e.g. deltaPref) derived based on the frequency difference, e.g. using droop control, and based on a maximum available power the respective first or second wind turbine, in particular via a clamp.

According to an embodiment of the present invention, a wind turbine power reference of each of the first and second wind turbines is limited by a power limit derived from a park master maximum power reference (e.g. Pmax_parkcontrol) and a power offset derived, in particular using droop, in dependence of the frequency difference. Thereby, an effective and simple control procedure, in particular including grid forming algorithm including load balancing may be achieved.

According to an embodiment of the present invention, the method further comprises starting at least one other first wind turbine to produce electrical energy from wind energy before starting any second (and/or any third) wind turbine, in particular automatically synchronizing with the first wind turbine, thereby utilizing the respective grid independent energy supply for starting.

If more than one first wind turbine of the first group of wind turbines is capable of starting independently of the voltage or power provided within the collector system, the electrical properties of the collector system may be reached in a faster manner and may have better stability.

According to an embodiment of the present invention, the method further comprises running, in particular at a wind park controller, synchronisation control regarding adjusting magnitude and/or phase of the collector system voltage to respective values of the utility grid; and connecting the collector system to the utility grid, if magnitude and/or phase of the collector system voltage essentially matches those of the utility grid in predefined margin. Thus, it may be ensured that the collector system is only connected to the utility system if the voltage is in phase and the collector system frequency essentially matches the desired or nominal utility grid frequency.

According to an embodiment of the present invention, the respective grid independent energy supply of each first wind turbine is disconnected from the collector system during the energization sequence but is connectable to the collector system for recharging when the collector system has been energized, wherein at least one of the grid independent energy supply of any of the at least one first wind turbine comprises at least one of: a Diesel and/or hydrogen powered generator; a solar cell system; an electric energy storage, in particular battery, accumulator, capacitor bank. Thus, a respective grid independent energy supply may only be capable of supplying energy to the associated wind turbine but not to any other wind turbine of the wind park.

It should be understood that features, individually or in any combination, disclosed, described or explained with respect or in the context of a method of starting a wind park may also be applied, independently or in any combination, to a wind park according to embodiments of the present invention and vice versa.

According to an embodiment of the present invention it is provided a wind park comprising plural wind turbines connectable in a collector system connectable to a utility grid, the wind park being adapted to perform a method according to one of the preceding embodiments.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

BRIEF DESCRIPTION

Figure 2:
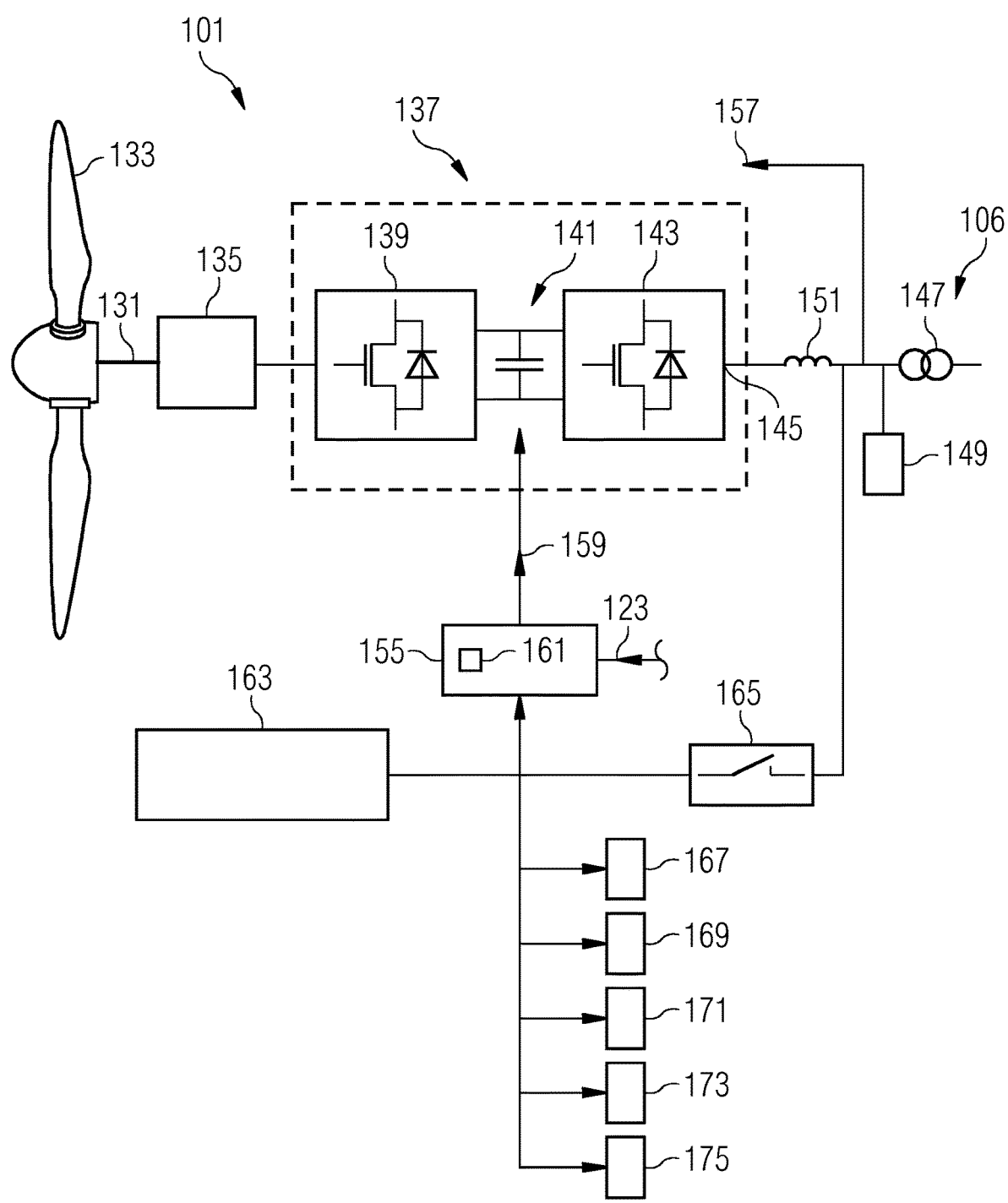
Figure 3:
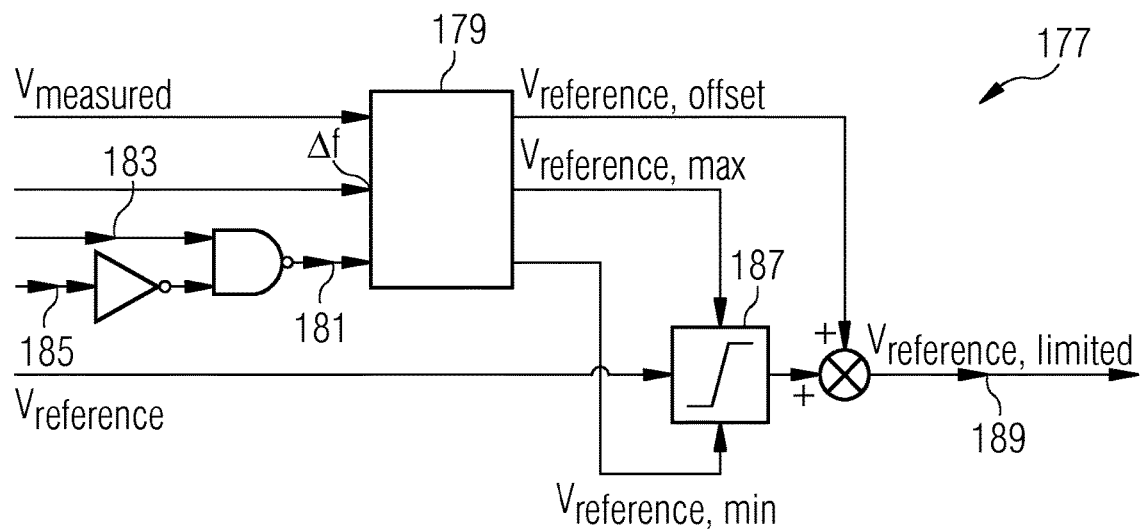
Figure 4:
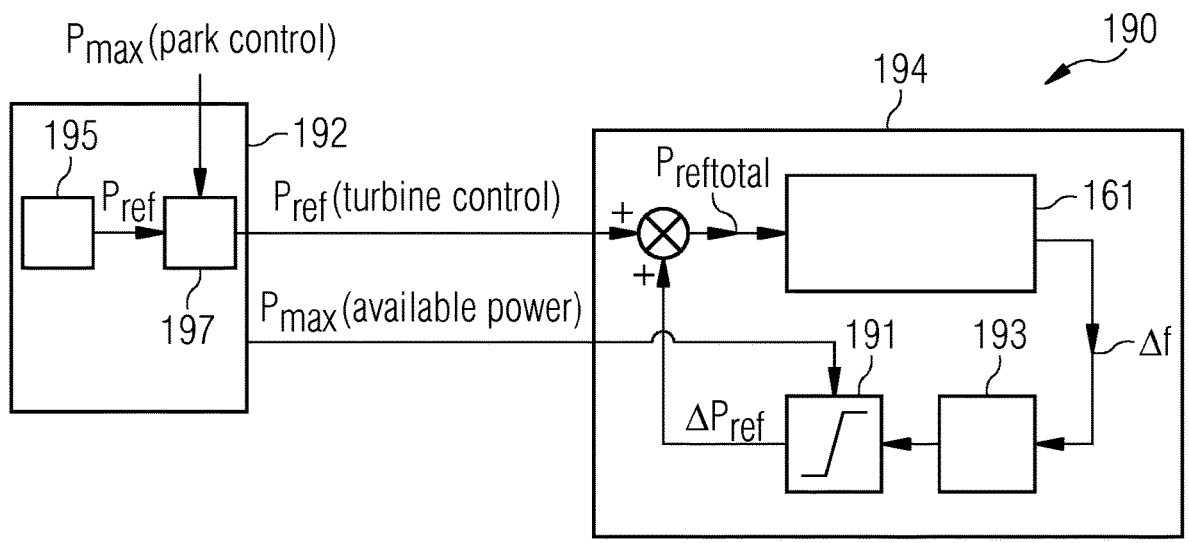
Figure 5:
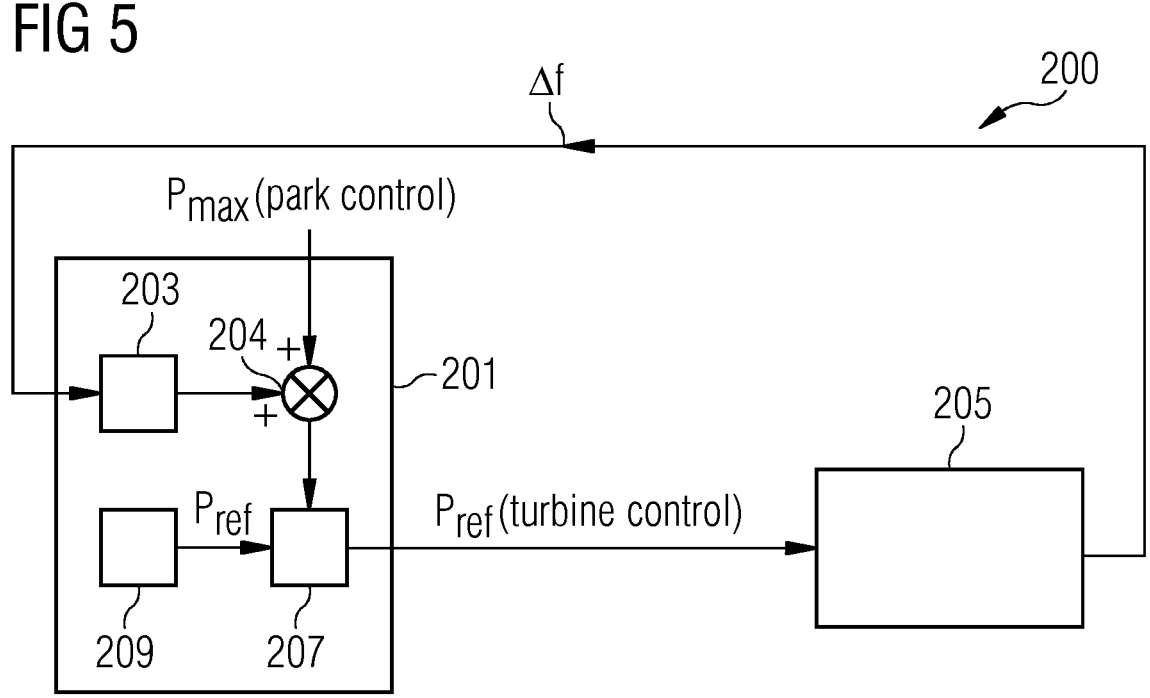

Some of the embodiments will be described in detail, with reference to the following figures, wherein like designations denote like members, wherein:

FIG. 1 schematically illustrates a wind park according to an embodiment of the present invention;

FIG. 2 schematically illustrates a (e.g. first) wind turbine of a wind park according to an embodiment of the present invention;

FIG. 3 schematically illustrates a method scheme performed in the context of a grid forming function performed by one or more wind turbines of the wind park illustrated in FIG. 1;

FIG. 4 schematically illustrates a method schemes performed by one or more wind turbines of the wind park illustrated in FIG. 1; and FIG. 5 schematically shows the additional power commanded by the governor function could also be added to the limiting function of the wind turbine's main power control.

DETAILED DESCRIPTION

The illustration in the drawings is in schematic form. It is noted that in different figures, similar or identical elements are provided with the same or similar reference signs or with reference signs, which are different from the corresponding reference signs only within the last letter.

The wind park 100 schematically illustrated in FIG. 1 comprises at least one first wind turbine 101a, 101b, 101c each of which is provided with an utility grid independent energy supply 103a, 103b, 103c, respectively, which may be utilized for starting the first wind turbine 101a, 101b, 101c, respectively, in a situation where a collector system 106 comprising cables 105 (and potentially other components like capacitor banks, transformer, filters and the like) which are all connected to a point of common coupling 107 is disconnected from a utility grid 109 by opening a wind park breaker 111. Note that the wind park breaker in this context defines the boundary between the islanded wind farm system and the utility grid, which for example includes both the wind farm side and the grid side of an export line as well as an extended wind farm network including a portion of the nearby utility grid. In this situation, the wind park 100 is disconnected from the utility grid 109 and is thereby also referred to as an islanded wind park.

The wind park 100 further comprises a second group of wind turbines comprising the second wind turbines 113a, 113b which are, as in the first wind turbines 101a, 101b, 101c equipped to perform a grid forming function (this functionality being indicated with a grey colour of the wind turbines).

The wind park 100 further comprises third wind turbines 115a, 115b, 115c, 115d of a third group of wind turbines which neither have a utility grid independent power supply nor are capable of performing a grid forming function.

Via a park transformer 117, the point of common coupling 107 may be connected, when the wind park breaker 111 is closed, to the utility grid 109. For controlling functions or the operation of the wind turbine, also a park level controller 119 is provided which may receive an external input 121 (such as regarding a demanded voltage, frequency, active power, reactive power) and which may output control signals 123 to all wind turbines of the wind park 100 in order to control the operation, in particular to supply coordination signals, for example release signals, regarding power limit, regarding voltage reference and the like. The park level controller 119 may also be capable of actuating the wind park breaker 111 for controlled closing and opening the breaker. Furthermore, via sensors 125, 127, electrical properties for example between the point of common coupling 107 and the wind park transformer 117 are sensed or measured and supplied via measurement signals or sensor signals 129 to the park level controller 119. The measurement signals 129 may for example comprise measurement values of the frequency and/or the voltage at the point of common coupling 107 corresponding also to a voltage of the collector system collectively referred to with reference sign 106.

The wind park 100 is capable of performing a method of starting the wind park according to an embodiment of the present invention. Thereby, first at least one first wind turbine 101a, 101b, 101c is started to produce electrical energy from the wind energy (whenever sufficient wind is present), thereby utilizing the respective grid independent energy supply 103a, 103b, 103c, respectively, for starting. Thereupon, after having reached a state where power production can commence, the respective first wind turbine 101a, 101b, 101c may be connected (via not explicitly illustrated wind turbine breakers) to the collector system 106. After the first wind turbine (e.g. 101a, 101b and/or 101c) has been connected to the collector system, the respective first wind turbine(s) may perform a grid forming function for achieving desired electrical properties within the collector system 106 and thus also at the point of common coupling 107.

After the collector system 106 is sufficiently energized (for example has reached a desired collector system voltage, such as a reference voltage in the collector system), at least one of the second and/or third wind turbines 115a, 115b, 115c, 115d may be started thereby utilizing energy from the collector system 106. Thereby, not explicitly depicted wind turbine breakers may be closed and connect the respective third wind turbines to the collector system 106.

Before or concurrently with starting and/or connecting one or more of the third wind turbines 115a, 115b, 115c, 115d to the collector system, one or more of the second wind turbines 113a, 113b may be started and may be connected to the collector system. Thereby, also the second wind turbines 113a, 113b may perform the grid forming function to further stabilize the collector system electrical properties, in particular the voltage and/or frequency to desired values.

One or more of the first wind turbines may start independently from each other, thus providing a distributed black start. Once the collector grid's electrical properties are within desired values, the second wind turbines may start independently from each other and the from the first wind turbines. The third wind turbine(s) may, once released for operation, start up independently, but may be unreleased if the number of first and second wind turbines reduce below the level required to support the number of online third turbines. Furthermore, frequency to power offset droop (or similar) may be utilized within the grid forming functions of the first and/or the second wind turbine to balance the power produced by the wind turbines with the power required by the islanded collector system.

In particular, the first wind turbines and/or the second wind turbines may be equipped with the respective grid forming function which may be configured to allow ramping up the voltage at respective output terminals of the respective converters, until they reach their local current or power limit. In particular, (additional) black start equipped wind turbines (for example the first wind turbines of the first group having an individual power supply) may autonomously synchronize and connect to the partially energized collector system (AC system) and may share the total real and reactive power load of the islanded collector system (e.g. medium voltage system). The grid forming function of the first and/or the second wind turbines may support the start and/or operation of the third group of wind turbines (not being equipped with the grid forming function). Thereby, the third wind turbine may run for example a net side current control.

FIG. 2 schematically illustrates a wind turbine 101 of the first group of wind turbines as illustrated in FIG. 1. The first wind turbine 101 comprises a rotation shaft 131 at which plural rotor blades 133 are connected. Upon impact of wind, the rotation shaft 131 rotates and, since being connected to a rotor of a generator 135, thereby provides electric energy. The electric AC energy is supplied to a converter 137 comprising a generator side portion 139 (for example a AC-DC converter), a DC link 141 (for example comprising one or more capacitors) and a utility grid side portion 143 (for example a DC-AC converter). At the output terminal 145 of the converter 137, an active and reactive power (having in steady state operation a frequency equal to the grid frequency) is output which is further supplied to a wind turbine transformer 147 which transforms the output voltage to a medium voltage. Between the converter and the wind turbine transformer a pulse width modulation filter 149 and/or an inductance 151 may for example be utilized.

A wind turbine controller 155 may receive measurement signals such as a measurement signal 157 regarding the output voltage at or close to the output terminal 145 of the converter 137. The wind turbine controller 155 may further receive the control signals 123 from the park level controller 119 as is illustrated in FIG. 1. The wind turbine controller 155 may supply control signals 159 to the converter 137 for example controlling the rotational speed of the rotor 131 and also in particular in order to perform a grid forming function as implemented in a module 161.

For starting up the first wind turbine 101 which belongs to the first group of wind turbines, the first wind turbine 101 comprises a grid independent power supply 163 which may be for example configured as an electrical storage or a Diesel generator or a battery or the like. Before the wind turbine 101 is started, a breaker 165 which, when closed, connects the utility grid independent power supply 163 to essentially the output terminal of the converter 137, is opened. The grid independent power supply 163 is however connected to auxiliary and operational equipment of the wind turbine 101. In particular, the power supply 163 may be connected or connectable for energy supply to pumps or fans 167, may be connected to a pitching system 169, may be connected to a yawing system 171 and may be connected to measurement equipment 173 and may further be connected to a DC link pre-charging equipment 175 which may all or at least in part need electrical energy in order to support starting the wind turbine 101.

Not only one but two or even more of the first wind turbines of the first group of wind turbines may be started and may energize the collector system after a low wind period, rather than consider each wind turbine as an individual system. Rather than having stored energy and a suitably sized diesel generator for energizing the first cluster (e.g. string or group of strings) of wind turbines, X first wind turbine may be equipped with a small amount of storage that allows them to supply the auxiliary loads (for example 167, 169, 171, 173, 175) for a given number of hours and pre-charge the main converter DC link 141 when the start command (for example via signal 123 or via a locally set command) is given.

It should be noted that there is no direct electrical connection between the medium voltage collector system 106 and the individual grid independent energy supply 163, other than optional "recharge" state which may be achieved by closing the breaker 165.

The first turbines may comprise X wind turbines which may energize the islanded medium voltage collector system 106.

When there is insufficient wind to cover the auxiliary load and losses in the system, the wind farm system may be de-energized leaving the black start capable first wind turbines in hibernation mode waiting for sufficient wind to start up. In addition, the energy storage required to ride through period of low/no wind can be minimized if a group of wind turbines act in a coordinated (or combined) manner (which may also be referred to as distributed black start). A group of M turbines with M>4 is considered. If these wind turbines are oriented such that they are all pointing in different directions, and that these turbines are all full pitched, then when the wind returns, one of these four wind turbines may start to rotate. If these four wind turbines all contain sufficient energy storage to maintain their internal environmental control, then as the wind starts, one of these wind turbines may be enabled and start to energize the collector system (AC system) as described above. This one first wind turbine may now have sufficient generation capacity to provide for its own pitch, yaw and environmental control and internal systems. Thus, at this stage, the auxiliary systems 167, 169, 171, 173, 175 may be supplied with energy from the output terminal 145 of the converter 137.

As the voltage rises on the collector system, one of the other fully pitched turbines may start, initially by yawing into the wind than to start power production, as this will increase the collector system voltage. Each of these "selected wind turbines" will need to have the ability to start its pitch and yaw controls at reduced AC grid voltage. Once these black start capable wind turbines (for example the first group of wind turbines each being equipped with the grid forming algorithm) are all enabled, it can be calculated that the AC voltage on the islanded system will be sufficiently high such that remaining wind turbines may start using energy from the collector system. That may mean that the AC voltage at the collector system may be sufficient for the remaining Y and Z (e.g. second and/or third) wind turbines (where the third group are not provided with a grid forming algorithm) to start. If the low/no wind period is greater than the period at which dry is needed, then these wind turbines will need to go through the dry out procedure, that might be applied, if the turbine is left de-energized, such that moisture can gather inside the components. For electrical components moisture can cause flash-over when energized which can damage the component. To avoid this, the components are heated to allow any moisture to evaporate before starting.

For offshore wind farms it is understood that there is rarely a no wind condition which persists for >3 days.

Additionally, there could be a low rated, lower voltage cable between wind turbines to power up the auxiliary system without needing to energize the main transformers.

Multi-Sequence Energization

A single black start capable wind turbine (for example a wind turbine of the first group of wind turbines) may not have sufficient power available or reactive current capability to supply the (real power) loads on the islanded system or the reactive power requirements of the islanded system. Furthermore, embodiments of the present invention allow that multiple (first or second or third) wind turbines connect at different time intervals or time points so that a tight time coordination between the wind turbines may not be necessary. In particular, the energization of the collector system may be performed in a staged approach where it is the combined effort of all participating wind turbines that energizes the collector system, i.e. to keep the collector system at operating points where the number of connected wind turbines can support the complete electrical system both in terms of active and/or reactive power. On two levels this may be done as:

- having a sequential build-up of the electrical system, i.e. where string cables are connected one by one and the wind turbines on each string are started before the next string is connected. This may reduce the total load for the black start capable wind turbines.
- operating below nominal voltage until such time that sufficient wind turbines are connected to the collector system (for example are online) to cover the full active and reactive power load at nominal voltage.

The first black start wind turbine (a first wind turbine or a wind turbine of the first group of wind turbines) which is connected will ramp its pulse width modulation voltage magnitude from zero with a fixed ramp rate and until a threshold is reached. This threshold could be a preselected value or could be driven by the absolute value of the reactive power and/or absolute value of active power and/or a set current limit (e.g. total current) and/or a percentage of a set current limit. Thus, the first wind turbine may ramp up the collector system voltage to a limit value. In alternative embodiments, the voltage may be ramped until the power converter reaches its reactive power capacity and/or power capacity based on the prevailing wind conditions or a given percentage thereof. This may ensure that the wind turbine (in particular first wind turbine) will never exceed its physical restriction in terms of current rating etc. However, the real and/or reactive power requirements of the islanded collector system may and probably will exceed the capabilities of a single (first) wind turbine. The following and subsequent wind turbines may synchronize to the electrical system (which is now defined by the wind turbine(s) already connected) both in terms of measured voltage magnitude and (phase) angle. The ramping may be implemented as a slew-rate limit, a saturation that is gradually released or similar, as is schematically illustrated in FIG. 3.

When the following wind turbines connect, they will start from the measured voltage magnitude of the collector system, initially have zero reactive power flow and hence they will start to ramp up the voltage until they reach their capability limit or set threshold as described for the first wind turbine. The ability to control and synchronize to a less than nominal AC voltage supply is an enabling feature of the converter control. As the wind turbines are trying to increase the collector system voltage, the ramped voltage magnitude may or should always be larger than the measured voltage, i.e. $V_{reference,max} \geq V_{measured}$, and if a wind turbine were to have a voltage reference that was lower than the measured voltage, this wind turbine would in fact be pulling the voltage down. So, when a wind turbine is ramping up its voltage reference, it needs to make sure that the ramped value is larger than or equal to the measured voltage. When this other first wind turbine connects, it may contribute power and reactive power to the islanded collector system and thus may reduce the load on the previously connected first wind turbine, which may allow both wind turbines to increase the AC voltage of the collector system. It is this "sharing" of the total islanded load (both real and reactive powers) which may permit the energization of the collector system.

When the wind farm is at the intermediate stage of being energized to partial voltage level, it may be necessary to monitor the capabilities of the connected wind turbines (which may be changing due to wind conditions or the like), such that the level of energization is always at a level that matches the capabilities of the connected wind turbines. Thus, it may be ensured that the real and reactive power required by the islanded medium voltage collector system is equal to the real and reactive power produced by the wind turbines connected to the islanded collector system. It may be necessary to reduce the voltage level if for example a wind turbine disconnects during the ramping up. If a wind turbine disconnects, then the power available from the wind turbines will reduce. Reducing the voltage on the medium voltage collector system may reduce real and reactive power loads.

FIG. 3 schematically illustrates a method scheme 177 which may for example be implemented in the grid forming function module 161 of the wind turbine controller 155. A voltage ramp management module 179 receives $V_{measured}$ being the voltage at the wind turbine low voltage bus bar, for example the converter output terminal 145 as illustrated in FIG. 2. The voltage measurement may give a good indication of what the medium voltage at the collector system 106 may be as the low voltage and the medium voltage sides are electrically connected via the wind turbine transformer 147, as illustrated in FIG. 2. The voltage ramp management module 179 further receives the frequency error Δf representing a difference between the actual frequency in the collector system and a nominal frequency of the collector system voltage. The frequency error Δf may be an output of a grid forming converter control as is illustrated in FIG. 4.

The signal 183 (released) may be a status flag (binary 1 or 0) indicating whether the converter is released for operation. The signal 185 (in limit) is a status flag which may indicate if the net side converter is in current limit or in power limit (when the power being exported by the net side converter to the AC system is equal to the power being extracted from the available wind). From signals 183, 185 the voltage ramp signal 131 is derived (being a flag whether to ramp up the voltage or not) and is received by the management module.

$V_{reference,limited}$ 189 is the net side converter voltage reference. $V_{reference,offset}$ output by the voltage ramp management module 179 is an offset applied to the $V_{reference}$ to control the output voltage to balance real or reactive power when in the limit condition. $V_{reference,min}$, $V_{reference,max}$ are output by the voltage ramp management module 179 and provided to a limiting element 187 which limits $V_{reference}$. The voltage ramp management 179 outputs $V_{reference,offset}$ which is added to the output of the limiting element 187 resulting in the value $V_{reference,limited}$, also referred to as limited reference voltage 189. Thereby, a means to modify the reference voltage to the net side converter is provided which could for example be used for the initial voltage ramp up.

According to an embodiment, a droop between frequency error and a reference offset of the oscillator system voltage can be applied which may activate if the wind turbines cannot sustain the frequency or if there is a building power error (for example via cumulative sum). Another implementation could also be made like simply ramping down $V_{reference,max}$ until the frequency or power error has stabilized. A PI-controller or similar could also be used. The converter may at this point need to ensure that it is obeying the power reference from the turbine controller as the rotor would otherwise start to decelerate. An appropriate hysteresis band on frequency or power error may need to be put in place if ramps are used to avoid toggling between ramping up and down.

When the voltage magnitude is within the normal operating range, and the absolute reactive/active/apparent power and/or the reactive/active/total current is less than a set limit, the wind turbines may transfer into normal voltage control. At this point, the energy storages may be restored to their reference levels, for example by recharging them from the low voltage bus bar by for example closing the breaker 165 illustrated in FIG. 2.

Load Balancing

When operating the wind turbines on a wind farm island it is necessary to supply the active and reactive load on the island which may include constant or continuous adjustment of active and reactive power output as the load may change. In particular, the total load and the collector system, i.e. both active and reactive power, may be unknown. Due to the autonomous behaviour of the wind turbines it may also be unknown for the individual wind turbine how many other wind turbines may help share the imbalance in load.

Therefore, the first wind turbine (i.e. a wind turbine of the first group) and the wind turbines of the second group may run the grid forming algorithm on the network bridge converter that allows them to come online in an uncoordinated fashion, contribute to the system voltage and resist any changes to frequency and voltage. Such a grid forming algorithm may also be a virtual synchronous machine (VSM) type control or the power control as described in EP 3 116 085 A1. This may avoid the need to assign a master wind turbine that is supplying a reference voltage and which requires an additional layer of coordination because the grid forming wind turbines, by virtue of the network bridge converter control, may automatically synchronize to each other in a similar fashion as a synchronous machine and may share the task of balancing the system. That is, the wind turbines may have the ability to act as a back electromotive force (EMF) very similar to a synchronous machine.

The total active load of the islanded system may be unknown and may probably be time-varying and the wind turbines therefore need to adjust their power production to match this load. In particular, if the power produced by the already collector system connected wind turbines exceeds the load on the collector system, then the frequency will rise, and the opposite will happen if the load exceeds the power production, i.e. the frequency will decrease. Thus, according to embodiments of the present invention, the frequency output from the grid forming control (for example frequency error M in FIG. 4 or 5) is used via a droop gain to modify the power reference via a ΔPref term as in FIG. 3. Thereby, the frequency and power balance of the system may be controlled.

The controller portion 177 illustrated in FIG. 3 may represent a voltage management controlling module which may modify the effective voltage reference within the converter in response to a frequency error. This controller (for example controller 177 illustrated in FIG. 3) may be implemented in any suitable controller structure, proportional only, proportional differential, lead/lag, etc. The controller may effectively act like a governor on a conventional synchronous machine.

As all the Y load balancing wind turbines are subject to their local wind conditions at any point in time, each wind turbine may only have a power demand (for example Preftotal in FIG. 4) up to its available power (which may be determined by the prevailing wind conditions). For any additional reductions in frequency, the wind turbine outputting its available power may be required to push the additional demand for power to other wind turbines having room for up-regulation, which may mean that when any one wind turbine cannot produce more power it will not increase its power demand above what is available from the prevailing wind ($P_{max(availablepower)}$) in FIG. 4 which is implemented therein via a clamp 191. The governor function 193 in FIG. 4 has an output which must be subject to a time-varying upper limit as given from the available power of the wind turbine. If the additional power commanded (ΔPref in FIG. 4) by the governor is added after the main wind turbine power control, the governor function must limit its output to be no more than the wind turbine's available power (or an estimate thereof), which is what the clamp block 191 in FIG. 4 does.

In particular, the control scheme 190 illustrated in FIG. 4 illustrates a turbine controller 192 and a converter controller 194. The turbine controller 192 comprises a power control module 195 which generates a reference power Pref and sends it to a module 197 which evaluates various internal and external power limits including a centrally calculated maximum power $P_{max}$, which is received from a park control. The turbine controller 192 outputs a reference power $P_{ref}$ as well as a maximum available power $P_{max(availablepower)}$ which is supplied to the converter controller 194. The available maximum power $P_{max(availablepower)}$ is supplied to the clamp (or limiting element) 191 which outputs $\Delta P_{ref}$ which is the offsets of the reference power which is added to the reference power $P_{ref}$ provided from the turbine control. The value $P_{refTotal}$ is supplied to the grid forming converter control 161 which outputs the frequency error Δf which is supplied to the island mode control, for example droop gain or governor 193.

Alternatively, as shown in FIG. 5, the additional power commanded by the governor function could also be added to the limiting function of the wind turbine's main power control (i.e. the turbine control block 201 in FIG. 5). In this case, the governor response (for example by governor or island mode controller 203) may only be active when the available power is above the limit applied to the wind turbine's power reference.

For example, whilst the functionality shown in FIGS. 4 and 5 is the same or similar, it does not necessarily need to be implemented in the converter control.

The system may remain energized as long as the combined available power of all the wind turbines is at least that of the total active power demand. The frequency error that is used for the described load balancing control can clearly come from a number of sources, for example the converters internal control of frequency, the converters measurement of frequency, the turbine controls measurement of frequency or an external measurement unit.

In particular, the controller 200 illustrated in FIG. 5 comprises a turbine controller 201 and a grid forming converter control 205. Based on a frequency error $\Delta f$, the governor 203 (island mode control for example droop gain) outputs an offset 204 of a power which is added to the maximum power $P_{max}$ provided from the park control. The sum is provided to a limiting module 207 which receives a reference power $P_{ref}$ from a power controller 209. The module 207 outputs a reference power $P_{ref}$(turbine control) which is provided to the grid forming converter control 205 which outputs the frequency error $\Delta f$.

The use of a grid forming algorithm together with a frequency to power offset droop (assuming a simple proportional governor function) to balance the power production of the wind turbine to the islanded load, enables multiple parallel units to share the total load. The frequency to power offset control effectively act like a governor on a conventional synchronous machine. This controller may be implemented in any suitable controller structure, proportional only, proportional differential, lead/lag, etc. and may be supplemented by filters to achieve the desired control response.

Park Level Coordination

The park level coordination may allow for a higher level of automation but is not essential in order to perform the core function described above. The black start process may be initiated on request from the park level control or an external entity communicated to the wind turbines via the park level control. The park level controller may handle the high level coordination of releasing the operation of wind turbines with the appropriate capabilities at the appropriate time during the black start procedure. When the black start capable wind turbines have energized the collector system to within normal operation ranges, the park level control may release the remaining wind turbines in the wind farm that may run an entirely different network bridge control algorithm, for example a traditional DQ-axis current control.

As the total active load and the number of connected wind turbines at any given time are unknown when parameterizing the controllers, it may be useful to have a master controller that adjusts the power dispatch of the wind turbines to have them reduce the frequency error. The auxiliary equipment in the wind farm may have frequency ranges in which they can operate and if the governor droops (assuming a droop gain based governor) are to be parameterized for the worst case power imbalance and the minimum number of connected wind turbines, a high gain would be required in order to stay within the set frequency range.

Letting the park controller set the wind farm dispatch (effectively an estimate of the present load) based on a measurement of the frequency, may allow for lower governor gains to be used and reduces the dependency of parameterization on site specific conditions. Thereby, wind farm dispatch may refer to the power limit (for example shown as $P_{max(parkcontrol)}$ in FIG. 4) sent to the wind turbines from the park level control. In the case the internal black start was performed in order to contribute to the re-energization of the main power system, the park breaker needs to be closed when the internal black start is complete and the entity managing the complete system restoration is ready to bring the wind farm onto the utility system.

If the transmission system is already energized by some other generator, the voltage phasor on the wind farm side of the park breaker must first be aligned sufficiently close to the phasor on the grid side such that the disturbance from the breaker closure is kept sufficiently small.

A synchronization control may be run on the park controller to adjust voltage magnitude and phase to match those on the grid side of the breaker. When the errors are within the limits of the synchro-check relay, the park breaker will close at will and the wind farm be connected to the main power system. The voltage magnitude error may be limited through control of the wind turbine's terminal voltage and the angle error by running the wind farm network with a small (for example 100 mHz) frequency offset.

An advantage of embodiments of the present invention may come from exploiting the distributed nature of wind turbines. Each single wind turbine would likely not be able to handle the whole task of black starting the system, but any K number of them would. The starting method described above retains a large degree of autonomy for the individual wind turbines in that:

- there is no time critical control running on a central piece of equipment to coordinate the black start, and
- the wind turbines equipped with an energy buffer for black start are free to start up at any time after they have been released for black start, and will do so if there is sufficient wind, and hence provide the losses for the auxiliary systems (and if battery storage used for the Auxiliary supply, this could be recharged also, hence prolonging the period that the battery storage could maintain the Aux supplies)
- when energized and running the wind farm island, all turbines with the grid forming control software equally share the task of balancing the active and reactive power. At this point, wind turbines without these capabilities can also be connected and started up if their power production is needed in order to supply the active loads; in this context they could be considered as base load wind turbines.
- There is no "master" wind turbine that the others synchronize against and the wind turbines are thus free to connect and disconnect from islanded grid as dictated by the local wind conditions (of course provided that there is enough production between the wind turbines to keep the wind farm energized).

Embodiments of the present invention open up the possibility that a group of wind turbines within a windfarm, can start to energise a windfarm and then allow other wind turbines to connect and contribute to the overall real and reactive power load. Furthermore, it may be possible that additional wind turbines within the windfarm do not need to operate with the grid forming control algorithm used in the black start wind turbines, they could be standard current controlled wind turbines. This makes this solution potentially retro fitable to existing windfarms.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method of starting a wind park comprising a plurality of wind turbines connectable in a collector system connectable to a utility grid, the method comprising:
   starting at least one first wind turbine, each being equipped with a utility grid independent energy supply and a grid forming function, to produce electrical energy from wind energy, utilizing the respective grid independent energy supply for starting;
   performing the grid forming function by the at least one first wind turbine to achieve a reference voltage in the collector system;
   starting at least one second wind turbine and/or at least one third wind turbine to produce energy by conversion of wind energy, utilizing energy provided in the collector system for starting,
wherein performing the grid forming function by the first wind turbine includes:
   ramping up a converter output voltage of a converter of the first wind turbine in a controlled fashion until a current limit and/or power limit of the converter is reached,
   wherein ramping up the converter output voltage of the converter of the first wind turbine is performed such as to balance the system load by:
   monitoring an actual frequency of the collector system voltage;
   deriving a limited reference voltage based on a frequency difference between the actual frequency and a nominal frequency of the collector system voltage; and
   controlling the converter of the first wind turbine based on the limited reference voltage.

2. The method according to claim 1, wherein the at least one second wind turbine is equipped with a grid forming function, the method further comprising after starting the at least one second wind turbine:
   performing the grid forming function by the second wind turbine to achieve the reference voltage in the collector system.

3. The method according to claim 1, further comprising:
   connecting the first wind turbine to the collector system after having started the first wind turbine;
   connecting the second wind turbine to the collector system before starting the second wind turbine;
   connecting the third wind turbine to the collector system before starting the third wind turbine;
   automatically synchronizing the electrical output of the second wind turbine and/or the third wind turbine with that of the first wind turbine, wherein each of the third wind turbine performs a current control at a converter output terminal of the third wind turbine.

4. The method according to claim 1, wherein at least one of the second wind turbine and the third wind turbine is started, if a collector system voltage is between predefined voltage limits.

5. The method according to claim 1, wherein deriving the limited reference voltage comprises:
   deriving a maximum, a minimum and an offset of the reference voltage based on a measured collector system voltage and the frequency difference;
   deriving the limited reference voltage based on the maximum, the minimum and the offset of the reference voltage and the reference voltage.

6. The method according to claim 1,
   wherein at least one of the reference voltage and the limited reference voltage is lower than a nominal voltage of the collector system until the power produced by conversion of wind of collector system connected wind turbines essentially matches at least one of active and reactive power demand of the collector system and
   wherein at least one of the reference voltage and the limited reference voltage is greater than an actual voltage of the collector system.

7. The method according to claim 1, wherein performing the grid forming function by the first wind turbine supports active and/or reactive power requirements of the collector system including the wind turbines connected thereto.

8. The method according to claim 1, wherein a power reference of each of the at least one first and the at least one second wind turbine is derived, based on a preliminary power reference and a power reference offset derived based on the frequency difference, and based on a set fraction of maximum available power of the respective first or second wind turbine.

9. The method according to claim 1, wherein a wind turbine power reference of each of the first and second wind turbines is limited by a power limit derived from a park master maximum power reference and a power offset derived, in dependence of the frequency difference.

10. The method according to claim 1, further comprising:
    starting at least one other first wind turbine to produce electrical energy from wind energy before starting any second wind turbine, utilizing the respective grid independent energy supply for starting.

11. The method according to claim 1, further comprising:
    running synchronisation control regarding adjusting magnitude and phase of the collector system voltage to respective values of the utility grid; and
    connecting the collector system to the utility grid, if a magnitude and/or a phase of the collector system voltage essentially match those of the utility grid in a predefined margin.

12. The method according to claim 1, wherein the respective grid independent energy supply of each first wind turbine is disconnected from the collector system and connectable to the collector system,
    wherein at least one of the grid independent energy supply of any of the at least one first wind turbine comprises at least one of:
    a Diesel and/or hydrogen powered generator;
    a solar cell system;
    an electric energy storage, in particular battery, accumulator, capacitor bank.

13. A wind park comprising a plurality of wind turbines connectable in a collector system connectable to a utility grid, the wind park being adapted to perform the method according to claim 1.

* * * * *